United States Patent
Yoshida

(10) Patent No.: US 7,427,158 B2
(45) Date of Patent: Sep. 23, 2008

(54) ADVANCED THERMAL SENSOR

(75) Inventor: Munehiro Yoshida, Austin, TX (US)

(73) Assignee: Kabushiki Kaisha Toshiba, Tokyo (JP)

( * ) Notice: Subject to any disclaimer, the term of this patent is extended or adjusted under 35 U.S.C. 154(b) by 132 days.

(21) Appl. No.: 11/034,644

(22) Filed: Jan. 13, 2005

(65) Prior Publication Data

US 2006/0153277 A1    Jul. 13, 2006

(51) Int. Cl.
G01K 7/01 (2006.01)
G01K 7/14 (2006.01)

(52) U.S. Cl. ............... 374/172; 374/1; 374/170; 374/178; 327/513

(58) Field of Classification Search ............ 374/170, 374/178, 1; 327/512–513
See application file for complete search history.

(56) References Cited

U.S. PATENT DOCUMENTS

| | | | | |
|---|---|---|---|---|
| 3,908,162 | A * | 9/1975 | Marley et al. | 323/313 |
| 3,911,746 | A * | 10/1975 | Spangler et al. | 374/183 |
| 4,497,586 | A * | 2/1985 | Nelson | 374/163 |
| 4,588,940 | A * | 5/1986 | Embree et al. | 323/313 |
| 4,701,639 | A * | 10/1987 | Stanojevic | 327/83 |
| 5,214,370 | A | 5/1993 | Harm | |
| 5,451,892 | A | 9/1995 | Bailey | |
| 5,875,142 | A * | 2/1999 | Chevallier | 365/212 |
| 6,140,860 | A | 10/2000 | Sandhu | |
| 6,157,244 | A * | 12/2000 | Lee et al. | 327/539 |
| 6,232,829 | B1 * | 5/2001 | Dow | 327/539 |
| 6,236,320 | B1 * | 5/2001 | Senba | 340/584 |
| 6,489,831 | B1 * | 12/2002 | Matranga et al. | 327/512 |
| 6,733,174 | B2 * | 5/2004 | Matsumoto et al. | 374/178 |
| 6,736,540 | B1 * | 5/2004 | Sheehan et al. | 374/183 |
| 6,811,309 | B1 * | 11/2004 | Ravishanker | 374/178 |
| 6,813,131 | B2 * | 11/2004 | Schmalz | 361/105 |
| 6,921,199 | B2 * | 7/2005 | Aota et al. | 374/178 |
| 6,934,645 | B2 * | 8/2005 | Kim | 702/64 |
| 6,958,597 | B1 * | 10/2005 | Lin et al. | 323/313 |

(Continued)

FOREIGN PATENT DOCUMENTS

JP    09260589 A    * 10/1997

OTHER PUBLICATIONS

Banba et al., "A CMOS Bandgap Reference Circuit with Sub-1-V Operation", May 1999, IEEE JSSC vol. 34, No. 5, pp. 670-674.

*Primary Examiner*—Gail Verbitsky
(74) *Attorney, Agent, or Firm*—Law Offices of Mark L. Berrier

(57) ABSTRACT

Systems and methods for reducing the complexity and size of thermal sensors, where the voltage of a thermally sensitive device is compared to a reference voltage that varies as a function of temperature, rather than being constant. One embodiment comprises a thermal sensing system including a reference voltage generator, a thermal sensor and a comparator. The reference voltage generator is configured to generate a non-constant reference voltage that varies as a known function of temperature. The thermal sensor is configured to generate a sensor voltage that also varies as a known function of temperature. The functions of the reference and sensor voltages cross at a known temperature/voltage. The comparator is configured to compare the sensor voltage and the reference voltage and to generate a comparison output signal based on the comparison of the sensor voltage and the first reference voltage. A transition in this signal indicates the reference temperature.

18 Claims, 15 Drawing Sheets

U.S. PATENT DOCUMENTS

| | | | | |
|---|---|---|---|---|
| 7,033,072 B2 * | 4/2006 | Aota et al. | .................. | 374/178 |
| 7,078,954 B2 * | 7/2006 | Watanabe | .................. | 327/512 |
| 7,127,368 B2 * | 10/2006 | Choi | ...................... | 702/130 |
| 7,197,421 B2 * | 3/2007 | Pan | .......................... | 702/133 |
| 2003/0072119 A1 * | 4/2003 | Segarra | .................... | 361/93.8 |
| 2003/0214336 A1 * | 11/2003 | Watanabe | .................. | 327/200 |
| 2004/0004992 A1 * | 1/2004 | Aota et al. | .................. | 374/163 |
| 2004/0047397 A1 * | 3/2004 | Park et al. | .................. | 374/141 |
| 2004/0233600 A1 * | 11/2004 | Yoshida et al. | ................ | 361/90 |
| 2005/0220171 A1 * | 10/2005 | Faour et al. | ................. | 374/178 |
| 2006/0029123 A1 * | 2/2006 | Johnson | ..................... | 374/178 |
| 2006/0176052 A1 * | 8/2006 | Seo | ........................... | 324/224 |

* cited by examiner

ADVANCED THERMAL SENSOR

RELATED APPLICATIONS

This application is related to U.S. patent application Ser. No. 10/441,726, entitled "Thermal sensing circuits using bandgap voltage reference generators without trimming circuitray," filed on May 20, 2003 by Yoshida.

BACKGROUND

1. Field of the Invention

The present invention relates generally to electronic devices, and more particularly to systems and methods for sensing the temperature of devices such as integrated circuits.

2. Related Art

Integrated circuits such as microprocessors are becoming increasingly complex. The circuit components (e.g., transistors, diodes, resistors and the like) that form these devices are, at the same time, becoming increasingly small so that more and more functions may be performed by a particular integrated circuit. As the number of circuit components and functions grows, the amount of power that is typically consumed by these integrated circuits typically also increases. With the increased power consumption of the circuits, the amount of heat generated within the circuits increases as well. This heat may affect the performance of the devices, and may even cause the devices to fail.

As a result of the dangers presented by the generation of increased amounts of heat in electronic devices, it is often necessary to be able to detect temperatures within these devices. Thermal sensing circuits are therefore incorporated into some devices in order to detect dangerously high temperatures or even measure temperatures within the devices. For example, a thermal sensing circuit can be incorporated into an integrated circuit in order to sense the temperature of the circuit and determine whether the temperature exceeds a predetermined threshold. If the temperature exceeds this threshold, corrective action (e.g., reducing the activity within the circuit or even shutting down the circuit) can be taken in order to reduce the temperature to a safer level.

One way to implement a thermal sensing circuit is to provide a device or circuit that is sensitive to changes in temperature, and to compare a voltage generated by this device to a reference voltage. For example, a diode may be used for this purpose. When the voltage of the thermally sensitive device/circuit is equal to the reference voltage, the temperature is equal to a known temperature corresponding to this voltage. If the voltage of the thermally sensitive device/circuit is less (or greater) than the reference voltage, the temperature is lower (or higher) than the known temperature.

The relationship of temperature and voltage in the thermally sensitive device/circuit is typically well known, but in order to accurately determine the temperature of the device/circuit, it is necessary to know the voltage of the device/circuit with accuracy. The reference voltage is used for this purpose. The greater the accuracy with which the reference voltage is known, the greater the accuracy with which the temperature can be determined.

Conventionally, thermal sensing circuits are designed using a constant temperature-independent reference voltage. Typically, Bandgap reference circuit is used for this purpose, and a great deal of care is taken to ensure that the source of this reference voltage is very stable and insensitive to manufacturing variations, variations in temperature, etc. As a result, the source of the reference voltage is typically a complex circuit that includes a relatively large number of components and occupies a relatively large area on the chip in which it is implemented. It would be desirable to be able to provide systems and methods for thermal sensing that are less complex, and that require less area on the chip.

SUMMARY OF THE INVENTION

One or more of the problems outlined above may be solved by the various embodiments of the invention. Broadly speaking, the invention includes systems and methods for reducing the complexity and size of thermal sensors, where the voltage of a thermally sensitive device is compared to a reference voltage that varies as a function of temperature, rather than being constant.

One embodiment comprises a thermal sensing system including a reference voltage generator, a thermal sensor and a comparator. The reference voltage generator is configured to generate a non-constant reference voltage that varies as a known function of temperature. The thermal sensor is configured to generate a sensor voltage that also varies as a known function of temperature. The functions of the reference and sensor voltages cross at a known temperature/voltage. The comparator is configured to compare the sensor voltage and the reference voltage and to generate a comparison output signal based on the comparison of the sensor voltage and the first reference voltage. A transition in this signal indicates the reference temperature.

An alternative embodiment comprises a thermal sensing system that also has a reference voltage generator, a thermal sensor and a comparator. The reference voltage generator in this embodiment is configured to generate multiple non-constant reference voltages, each varying as a different, known function of temperature. The thermal sensor is configured to generate a sensor voltage that also varies as a known function of temperature. One or more comparators are used to compare the sensor voltage with each of the reference voltages and to generate corresponding comparison output signals. A transition in each signal indicates that the corresponding reference temperature has been reached.

Another alternative embodiment comprises a method including providing a reference voltage source, providing a thermal sensor, comparing signals produced by the reference voltage source and the thermal sensor, and generating a temperature indicator signal that indicates whether the thermal sensor signal is higher or lower than the reference signal. In this method, the reference voltage source provides a reference voltage that increases as a known function of temperature and is insensitive to manufacturing variations. The thermal sensor provides a sensor voltage that decreases as a known function of temperature and is insensitive to manufacturing variations. In one embodiment, the temperature indicator signal is not asserted when the sensor voltage is less than the reference voltage and is asserted when the sensor voltage is greater than the reference voltage. In another alternative embodiment, the sensor signal may be compared with multiple reference signals to determine when a sensed temperature is equal to corresponding reference temperatures.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
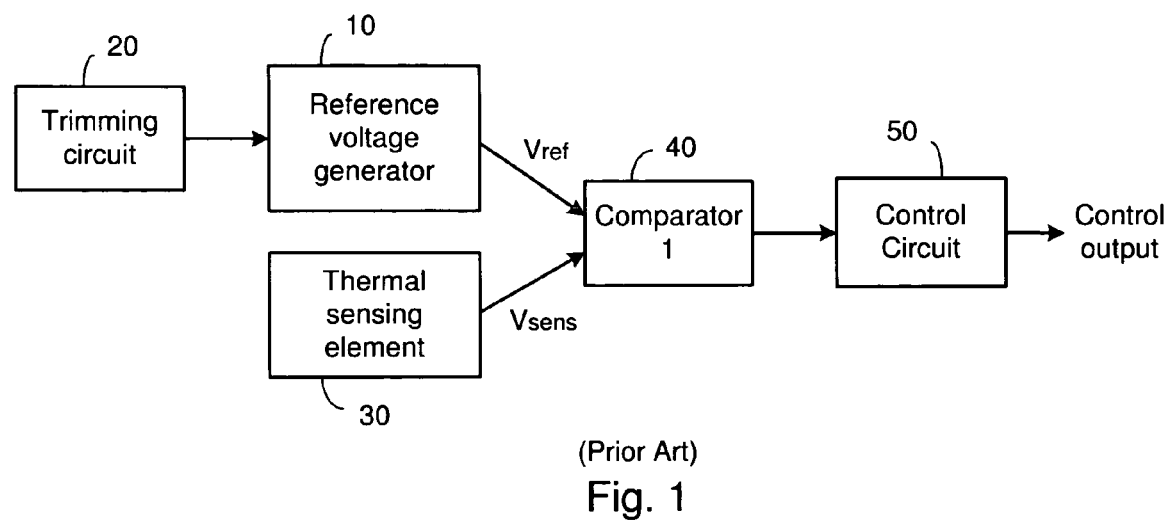
FIG. 1 is a block diagram illustrating the structure of a thermal sensing circuit in accordance with the prior art.

While the invention is subject to various modifications and alternative forms, specific embodiments thereof are shown by way of example in the drawings and the accompanying detailed description. It should be understood that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

Broadly speaking, the invention includes systems and methods for reducing the complexity and size of thermal sensors, where the voltage of a thermally sensitive device is compared to a reference voltage that varies as a function of temperature, rather than being constant. In one embodiment, a diode is used to generate a first voltage that decreases as a function of temperature. One or more reference voltages that increase as functions of temperature are also generated. The first voltage is then compared to the reference voltages. When the first voltage is equal to one of the reference voltages, the temperature of the diode and the reference voltage generation circuit(s) is equal to a known temperature. This known temperature is different for each of the different reference voltages. The result of the comparison of the first voltage and the reference voltages can be used in the same manner as in conventional systems in which constant reference voltages are used.

The present systems and methods may provide several advantages over conventional systems and methods. For example, the generation of a reference voltage that increases with temperature is typically easier than the generation of a constant reference voltage, so the reference voltage generation circuit is typically less complex. Because the less complex circuit has fewer circuit components, it typically requires less space on a chip than a conventional reference voltage generation circuit. Additionally, the differences between the first voltage and the reference voltages are greater in the present systems and methods than in conventional systems and methods. This is because the first voltage (which decreases with temperature) is compared with voltages that increase with temperature, rather than remaining constant. The greater voltage difference is easier to amplify than the smaller voltage difference in conventional systems and methods.

Before discussing the various embodiments of the invention in detail, it will be helpful to briefly discuss conventional systems for sensing temperatures and electronic devices. Referring to FIG. 1, a block diagram illustrating the structure of a thermal sensing circuit in accordance with the prior art is shown. In this figure, a reference voltage generator 10 generates a reference voltage that is constant over a range of temperatures. A trimming circuit 20 is typically coupled to reference voltage generator 10 in order to allow the value of the constant reference voltage to be adjusted. This is often necessary because of manufacturing variations in the circuits.

A thermal sensing element 30 generates a voltage that varies with the temperature of the sensing element. The sensing element may, for example, be a diode, and the corresponding voltage generated by thermal sensing element 30 will decrease as the temperature of the sensing element increases. The reference voltage generated by a reference voltage generator 10 and the temperature-dependent voltage generated by thermal sensing element 30 are both provided to comparator 40. Comparator 40 is configured to determine whether the voltage provided by thermal sensing element 30 is higher or lower than the reference voltage provided by a reference voltage generator 10.

Comparator 40 generates a binary output signal that is asserted (or not) depending upon the relationship between the two received voltages. Typically, comparator 40 will be configured to generate a signal that is high when the voltage generated by thermal sensing element 30 is lower than the reference voltage of reference voltage generator 40 (i.e., the sensed temperature is higher than the temperature corresponding to the reference voltage.) The signal generated by comparator 40 is then provided to control circuit 50 that is configured to take corrective action if the signal from comparator 40 is asserted. For example, if the sensed temperature is above the reference temperature and the signal is asserted, control circuit 50 reduce the operating speed or shut down the circuit in which the thermal sensing system is implemented.

Figure 2:
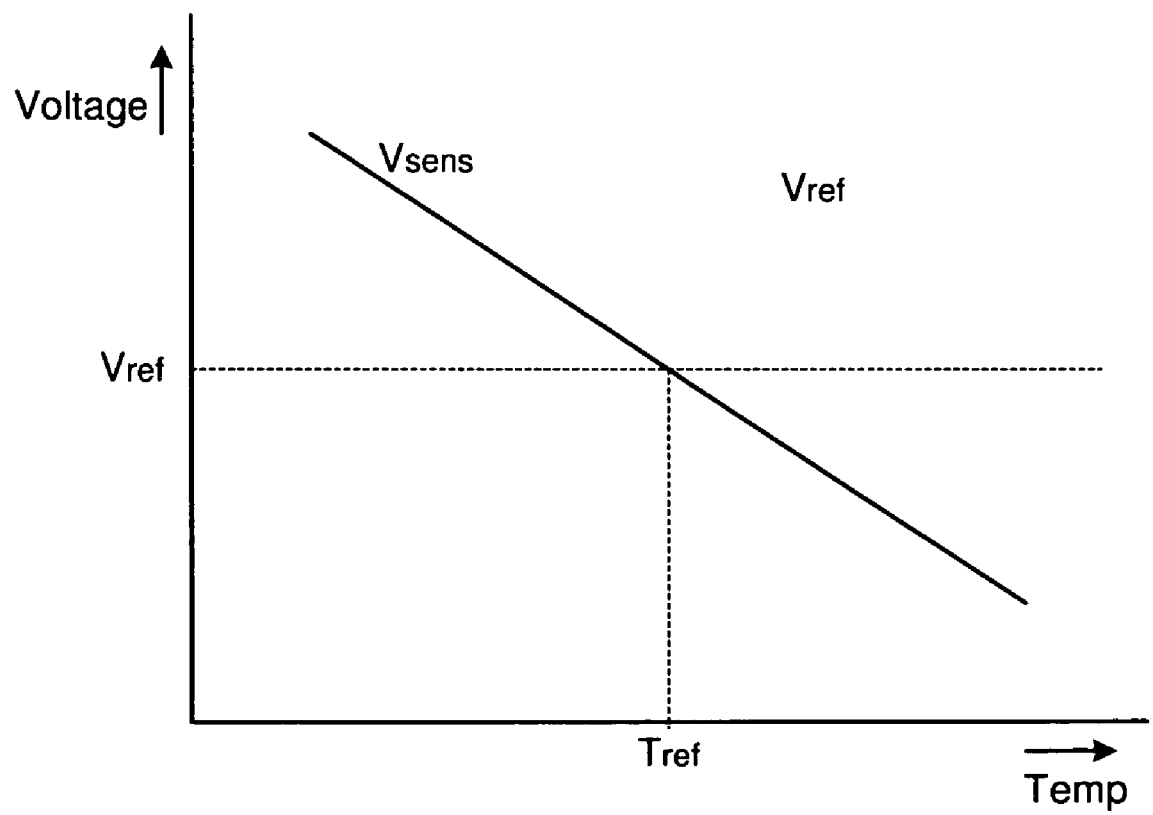
FIG. 2 is a diagram illustrating the relationship between the constant reference voltage produced by a reference voltage generator and a temperature-dependent voltage produced by a thermal sensing element in the system of FIG. 1.

Referring to FIG. 2, a diagram illustrating the relationship between the constant reference voltage produced by reference voltage generator 10 and the temperature-dependent voltage produced by thermal sensing element 30 in the system of FIG. 1 is shown. FIG. 2 is a graph of voltage (on the vertical axis) versus temperature (on the horizontal axis.) It can be seen from this figure that the reference voltage is constant, regardless of the temperature of the circuit. The voltage produced by thermal sensing element 30, the other hand, decreases as the temperature increases. It can be seen that these two voltage curves cross at a temperature, $T_0$.

Figure 3:
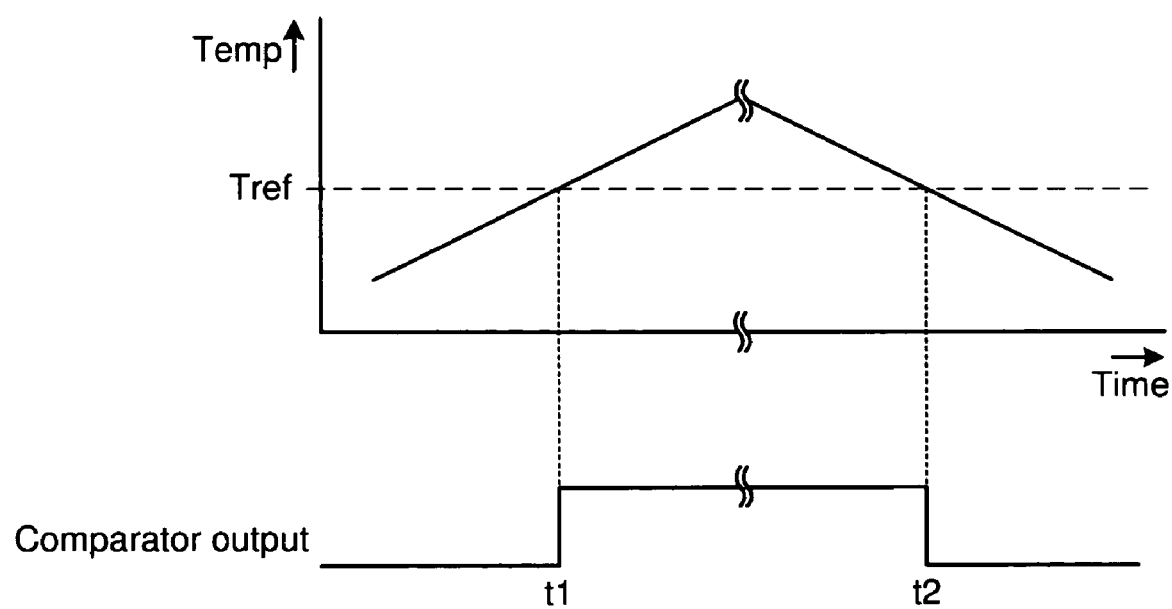
FIG. 3 is a diagram illustrating output signal generated by a comparator as a function of the relationship between sensed and reference temperatures in the system of FIG. 1.

Referring to FIG. 3, a diagram illustrating output signal generated by comparator 40 as a function of the relationship between the sensed and reference temperatures is shown. At the top of FIG. 3 is a graph of the sensed temperature (Ts) as a function of time. The constant reference temperature ($T_0$) is also indicated on the figure. At the bottom of the figure is the comparator output signal as a function of time. On the left side of FIG. 3, the sensed temperature is initially below the reference temperature. The binary output signal is therefore low. The sensed temperature gradually increases until, at time t1, the sensed temperature is equal to the reference temperature. The sensed temperature continues to increase so that it is greater than the reference temperature at time t1+Δt. When the sensed temperature becomes greater than the reference temperature, the binary output signal goes high. Later, the sensed temperature decreases, becoming less than the reference temperature at time t2. When the sensed temperature becomes less than the reference temperature, the binary output signal again goes low.

Figure 4:
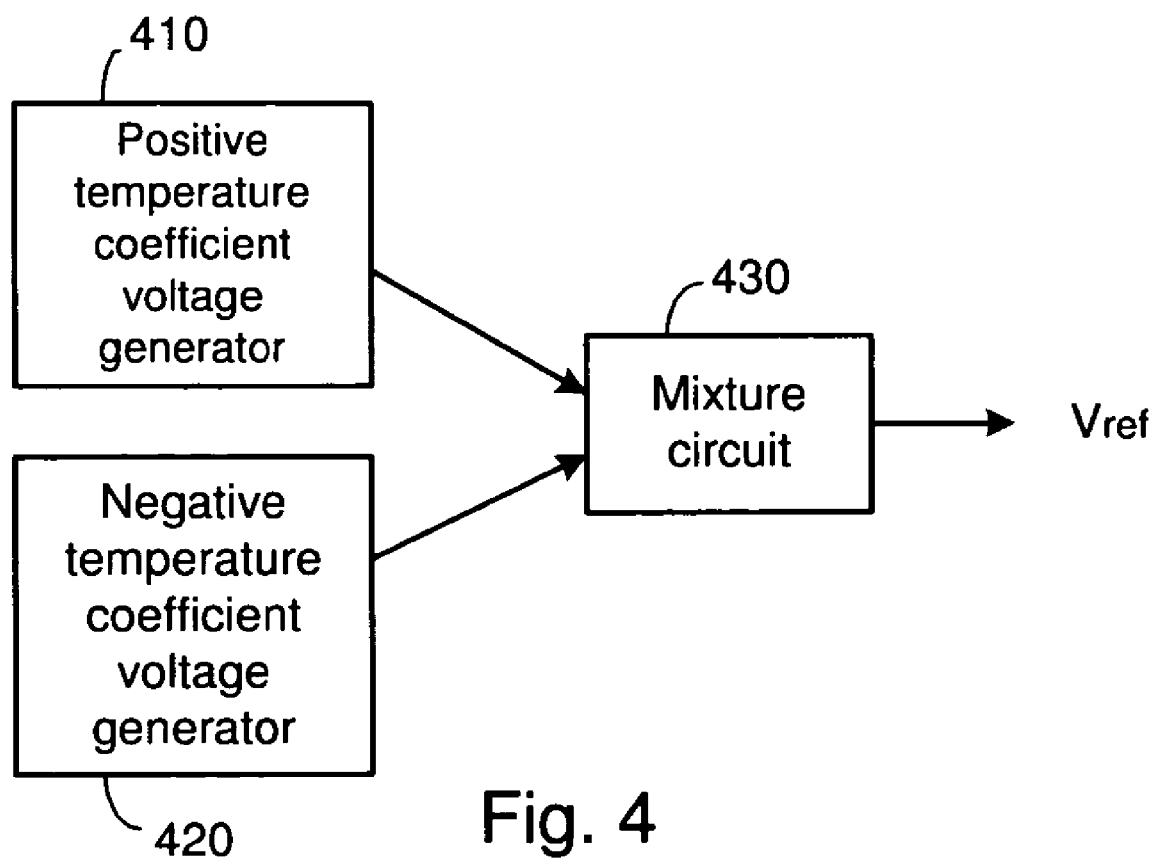
FIG. 4 is a diagram illustrating the structure of an exemplary reference voltage generator suitable for use in the system of FIG. 1.

Referring to FIG. 4, a example of reference voltage generator 10 in FIG. 1 is shown. This circuit is designed to provide a temperature-independent voltage, and is well known as bandgap reference circuit. Circuit 400 consists of a positive temperature-coefficient voltage generator 410, a negative temperature-coefficient voltage generator 420 and a mixture circuit 430 which is configured to composite these two voltages with a ratio adequate to generate a temperature-independent voltage. In other words, mixture circuit 430 balances the positive temperature coefficient of voltage generator 410 with the negative temperature coefficient of voltage generator 420 to produce a temperature-independent voltage.

Figure 5:
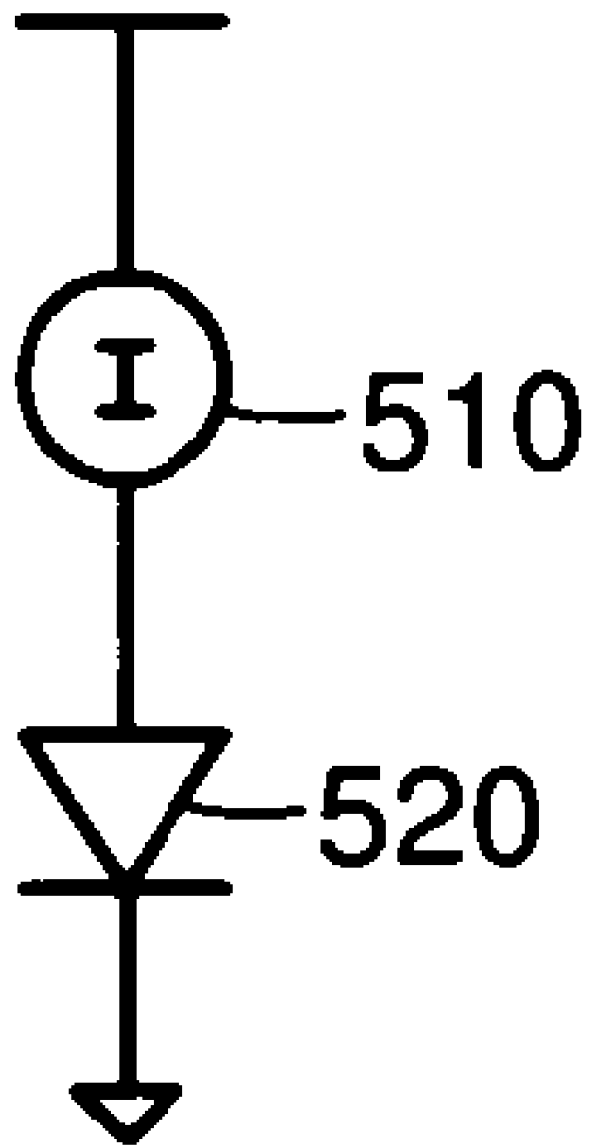
FIG. 5 is a diagram illustrating a thermal sensing element in accordance with one embodiment.

Referring to FIG. 5, a diagram illustrating a circuit suitable for use as thermal sensing element 30 in FIG. 1 is shown. This circuit includes a constant current source 510 and a diode 520. Constant current source 510 is coupled between a voltage source (e.g., Vdd) and the anode of diode 520. The cathode of diode 520 is coupled to ground. The sensor voltage ($V_{sens}$) is measured at the node between constant current source 510 and diode 520.

As noted above, the present systems and methods differ from conventional systems and methods by, for example, providing a reference voltage that is not constant. This allows the reference voltage generator design to be modified so that it is much simpler and requires much less space than conventional, constant-voltage designs. Further, because the reference voltage generator is designed in some embodiments to produce a voltage that increases with temperature, the difference between this reference voltage and the voltage produced by the thermal sensing element is greater than the difference between a constant reference voltage and the voltage of the thermal sensing element. Because the voltage difference is higher, it is easier to amplify, thereby making it easier to generate the binary output signal of the comparator.

Figure 6:
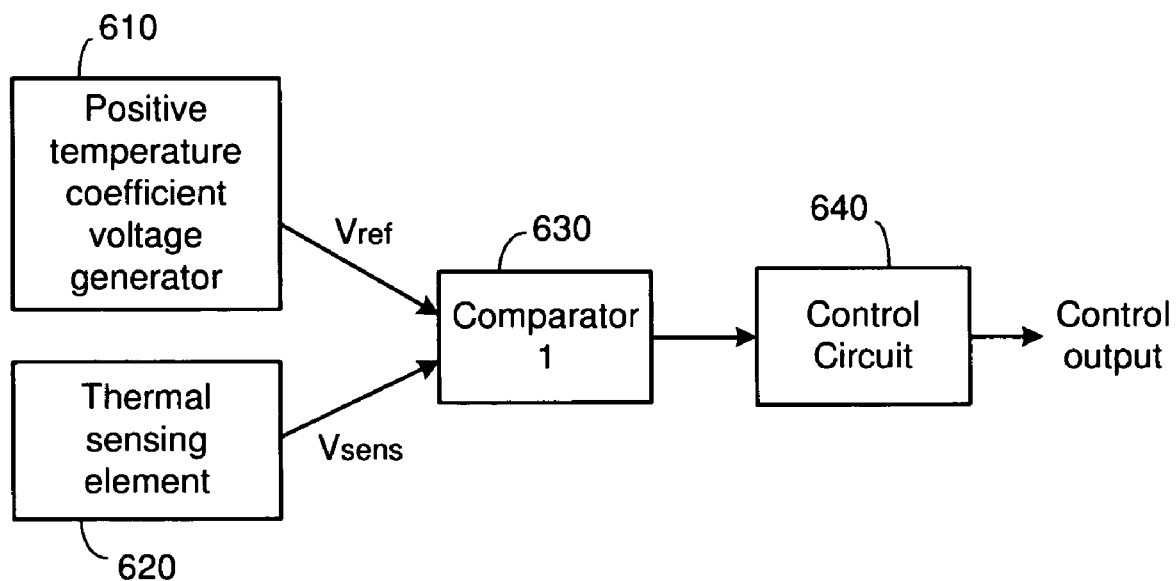
FIG. 6 is a block diagram illustrating the structure of a thermal sensing system in accordance with one embodiment.

Referring to FIG. 6, a block diagram illustrating the structure of a thermal sensing system in accordance with one embodiment is shown. It can be seen that the structure of this system is very similar to the structure of the system illustrated in FIG. 1. There are several differences, however. In system 600, a reference voltage is provided by positive temperature-coefficient voltage generator 610. Rather than generating a constant reference voltage as in the system of FIG. 1, positive temperature-coefficient voltage generator 610 produces a reference voltage that varies as a function of temperature. It is therefore unnecessary in this embodiment to provide a trimming circuit (as in the system of FIG. 1,) to allow adjustment of the reference voltage to account for manufacturing variations.

In one embodiment, the reference voltage produced by positive temperature-coefficient voltage generator 610 increases as a function of temperature, rather than generating a constant reference voltage. Because the non-constant reference voltage is known as accurately as the constant reference voltage that is typically generated in prior art systems, the embodiment of FIG. 6 is no less accurate than the prior art systems as a result of the temperature-varying nature of the reference voltage. In fact, the positive slope of the reference voltage curve as a function of temperature results in a greater difference between the reference voltage and the thermal sensor voltage than would result from a constant reference voltage, so it is easier to determine whether the thermal sensor voltage is greater than or less than the reference voltage. It may therefore be said that the present embodiments are, in this respect, more accurate than prior art systems.

In addition to positive temperature-coefficient voltage generator 610, system 600 includes a thermal sensing element 620, a comparator 630 and a control circuit 640. The reference voltage produced by positive temperature-coefficient voltage generator 610 and the sensor voltage produced by thermal sensing element 620 are provided to comparator 630. Comparator 630 compares these two voltages and produces an output signal that indicates whether the sensor voltage is greater than or less than the reference voltage. The signal produced by comparator 630 is than provided to control circuit 640, which processes the signal and generates control signals that are provided to the device in which the thermal sensing system is implemented. These control signals may affect the operation of the device (e.g., slowing down or shutting down the device,) depending upon the temperature sensed by thermal sensing element 630 and the corresponding signals output by comparator 630.

In FIG. 6, positive temperature-coefficient voltage generator 610 is roughly equivalent to temperature-coefficient voltage generator 410 in FIG. 4. Thermal sensing element 620, which generates a negative temperature-coefficient voltage is roughly equivalent to that used in the prior art as shown, for example, in FIG. 5.

Figure 7:
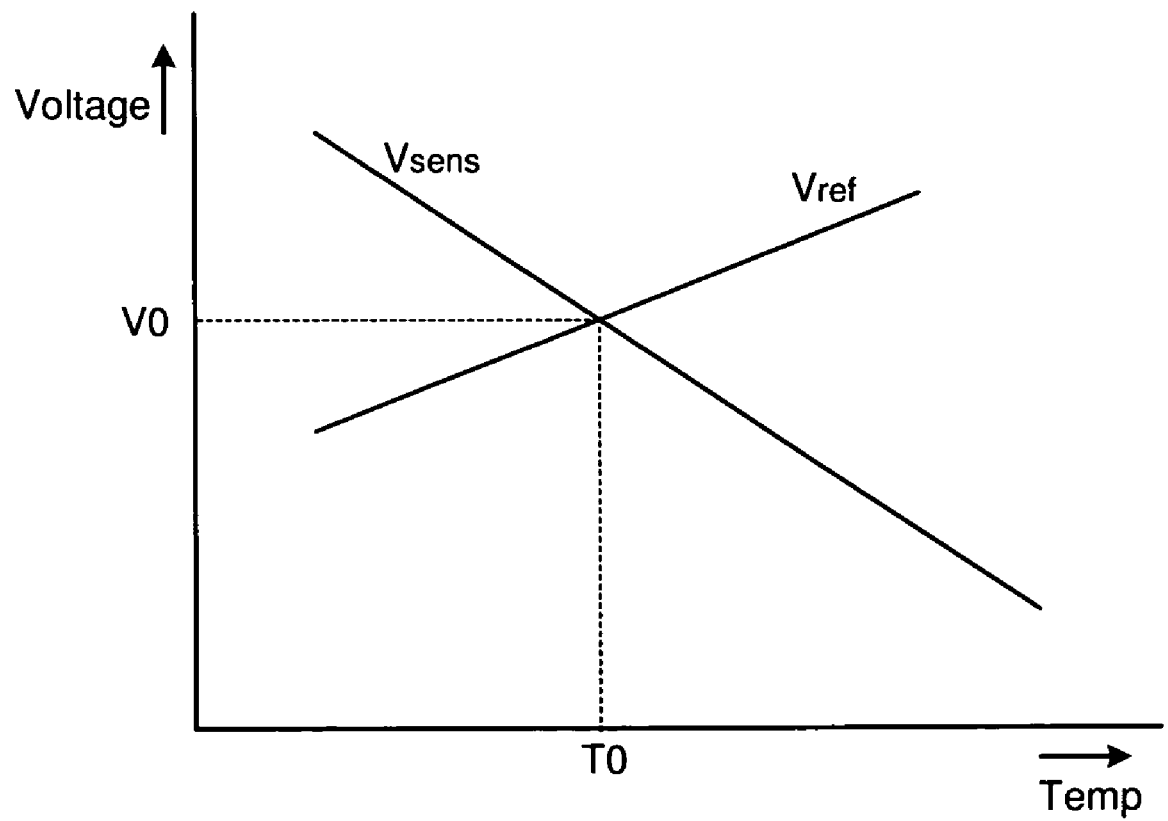
FIG. 7 is a diagram illustrating the relationship between a temperature-varying reference voltage and a sensor voltage in accordance with one embodiment.

Referring to FIG. 7, a diagram illustrating the relationship between the temperature-varying reference voltage and the sensor voltage in accordance with one embodiment is shown. FIG. 7 is a graph of voltage versus temperature. The voltages produced by positive temperature-coefficient voltage generator 610 and thermal sensing element 620 are plotted on the graph. The sensor voltage may, for example, be produced by taking the voltage drop across a diode that has a constant current passing through it. This voltage will decrease as the temperature of the diode increases, so the plot of the sensor voltage ($V_{sens}$) has a negative slope. Positive temperature-coefficient voltage generator 610, on the other hand, is configured to produce a voltage that increases as the temperature increases, resulting in a positive slope in the plot of the reference voltage ($V_0$.) An exemplary configuration of positive temperature-coefficient voltage generator 610 will be described in more detail below.

The plots of the reference voltage and to the sensor voltage cross at a particular point corresponding to a particular temperature and voltage. The temperature and voltage corresponding to this point on the graph are indicated by $T_0$ and $V_0$, respectively. Because both the reference voltage and the sensor voltage are based upon the bandgap energy of the semiconductor material of the device, these voltages are known with relatively good accuracy. The point at which the voltage plots cross ($V_0$, $T_0$) is therefore also known with relatively good accuracy.

Figure 8:
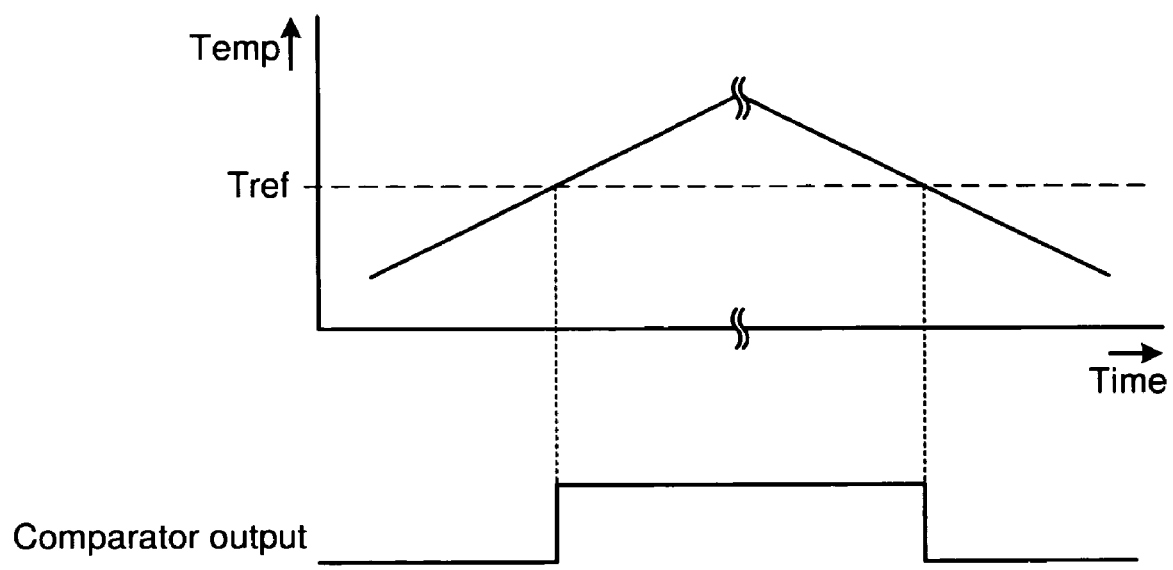
FIG. 8 is a diagram illustrating an output signal generated by a comparator as a function of the relationship between a sensed temperature and a reference temperature in accordance with one embodiment.

Referring to FIG. 8, a diagram illustrating the output signal generated by comparator 630 as a function of the relationship between the sensed temperature and a reference temperature in accordance with one embodiment is shown. FIG. 8 includes a graph of the temperature of thermal sensing element 620 as a function of time, as well as the output of comparator 630 as a function of time. The temperature of thermal sensing element 620 as shown in FIG. 8 is the same as the temperature illustrated in FIG. 3. It can be seen that the output signal produced by comparator 630 is the same as the output signal generated by the comparator in the prior art system (see FIG. 3.) The output of comparator 630 as a function of the temperature of thermal sensing element 620 is not affected by the use of a non-constant reference voltage, as produced by positive temperature-coefficient voltage generator 610. System 600 can therefore use the same control circuit 640 as is used in the prior art system (see item 50 in FIG. 1.)

Figure 9:
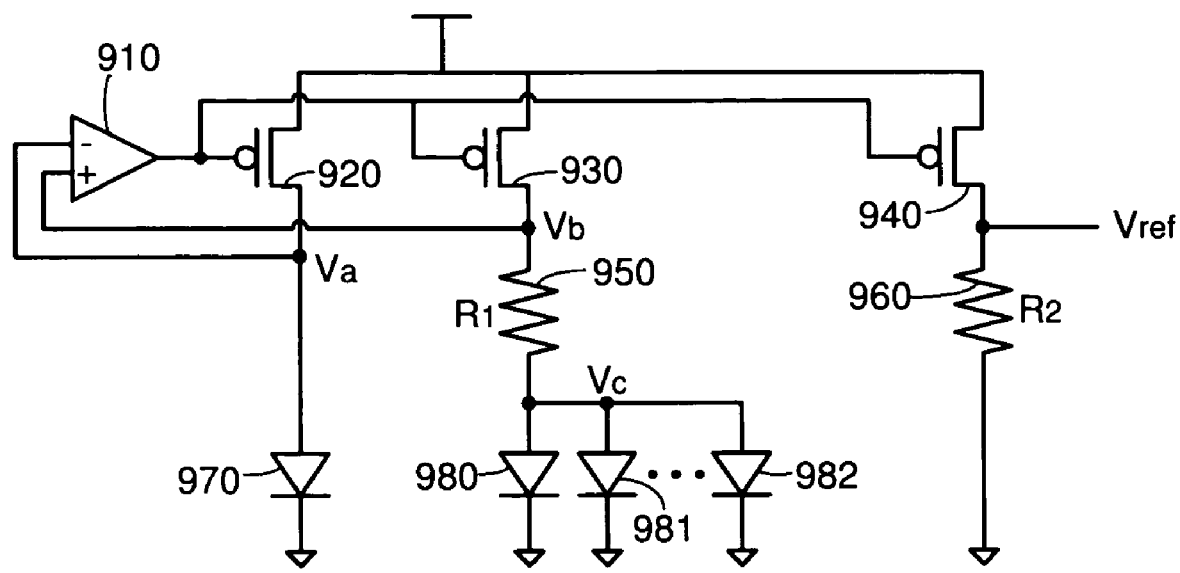
FIG. 9 is a diagram illustrating the structure of a thermal sensing system in accordance with one embodiment.

Referring to FIG. 9, a diagram illustrating the structure of positive temperature-coefficient voltage generator 610 in FIG. 6 is shown. This circuit 900 consists of an operational amplifier 910, three PMOS transistors (920, 930, 940,) two resistors (950, 960) and multiple diodes (970, 980-982.) It should be noted that, although only three diodes are explicitly shown in FIG. 9, the series of diodes 980-982 may include N diodes, where N is typically greater than or equal to 2.

The source of transistor 920 is coupled to the power supply voltage (Vdd.) The drain of transistor 920 is coupled to the anode of diode 970. The cathode of diode 970 is coupled to ground. The source of transistor 930 is also coupled to the power supply voltage, but the drain of this transistor is coupled to one end of resistor 950. The other end of resistor 950 is coupled to the anodes of each of diodes 980-982. The cathodes of each of diodes 980-982 are coupled to ground. The source of transistor 940 is also coupled to the power supply voltage. The drain of transistor 940 is coupled to one end of resistor 960. The other end of resistor 960 is coupled to ground.

The gates of each of transistors 920, 930 and 940 are coupled to the output of operational amplifier 910. If each of transistors 920, 930 and 940 is identical, the same amount of current flows through each of these transistors. The inputs of operational amplifier 910 are coupled to the drains of transistors 920 and 930. The voltage ($V_a$) at the drain of transistor 920 is the potential across the PN junction of diode 970. The voltage ($V_b$) at the drain of transistor 930 is this some of the potentials across resistor 950 and the PN junctions of diodes 980-982 (which are effectively the same as a single PN junction with greater cross-sectional area than diode 970.)

The characteristic behavior of a diode can be expressed as $I \sim I_s \exp(qV_{be}/kT)$. If the current through diode 970 can be set equal to the sum of the currents through diodes 980-982, then:

$$I_s \exp(qV_d/kT) = N*I_s \exp(qV_c/kT)$$

where $V_c$ is the voltage at the node between resistor 950 and diodes 980-982, and N is the number of diodes 980-982. Then, the voltage across resistor 950 can be expressed as:

$$\Delta V_f = V_a - V_c = \ln N * kT/q$$

Then, since the current through transistor 930 is the same as the current through transistor 940, the reference voltage can be expressed as:

$$V_{ref} = \Delta V_f * R_2/R_1$$

where $R_1$ is the value of resistor 950, and $R_2$ is the value of resistor 960. The reference voltage can therefore be set to a desired value by the appropriate choice of $R_1$ and $R_2$.

Circuit 900 produces a single reference voltage that, when compared with the sensor voltage that has negative temperature-coefficient generated by thermal sensing element, results in a single binary output that indicates whether the sensor temperature is above or below a reference temperature. While this system may be useful to indicate when an electronic device in which it is implemented has reached a temperature that is too high, the system does not provide any information as to when the temperature has dropped to a safe level. It may therefore be useful to provide embodiments in which multiple reference voltages are provided, so that more temperature information for the electronic device can be obtained.

In the circuit of FIG. 9, the first transistor (920) and the first diode (970) serve as the thermal sensor shown FIG. 5. Transistor 920 corresponds to constant current source 510, while diode 970 corresponds to diode 520. The voltage at the drain out transistor 920 ($V_a$) therefore corresponds to the sensor voltage, $V_{sens}$. The current through diode (970) is not constant. But the voltage cross the diode (970) has negative temperature-coefficient, approximately $-1.5$ mV/K.

Figure 10:
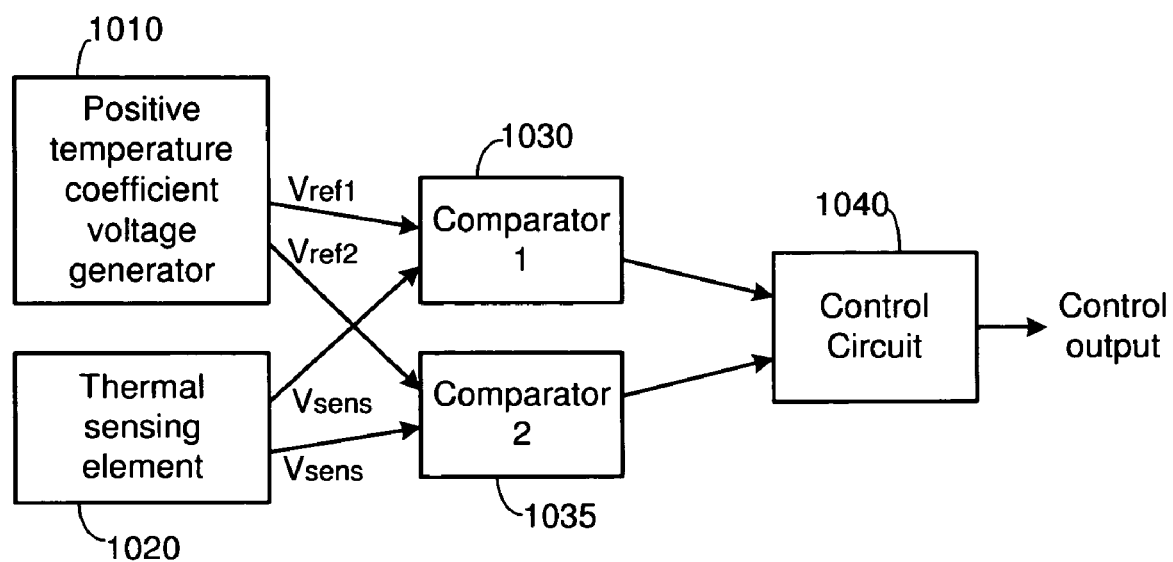
FIG. 10 is a block diagram illustrating the structure of a thermal sensing system in accordance with an alternative embodiment.

As noted above, positive temperature-coefficient voltage generator circuit 900 potentially can generate negative temperature-coefficient voltage ($V_a$) and can provide to comparator 630 in FIG. 6 as $V_{sens}$ Referring to FIG. 10, a block diagram illustrating the structure of a thermal sensing system in accordance with an alternative embodiment is shown. System 1000 is very similar to system 900, except that positive temperature-coefficient voltage generator 1010 produces two reference voltages, and provides these voltages to two different comparators, 1030 and 1035. Thermal sensing element 1020 provides the voltage corresponding to be sensed temperature to both of these comparators as well. Then, comparator 1030 compares the sensor voltage to the first reference voltage, and comparator 1035 compares the sensor voltage to the second reference voltage. Each of comparators 1030 and 1035 provides a separate binary output signal to control circuit 1040, which processes the signals received from the comparators and generates control signals that may affect (e.g., slow or shut down) the operation of the electronic device.

Figure 11:
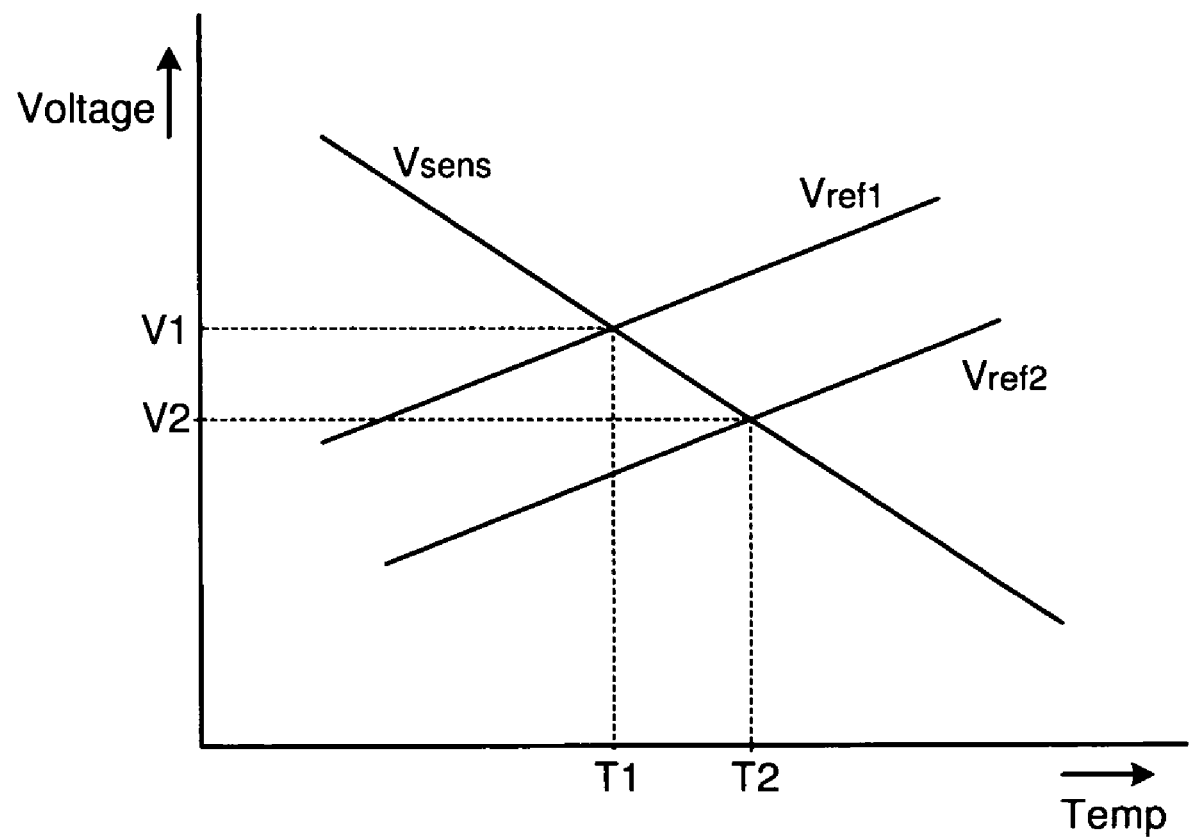
FIG. 11 is a diagram illustrating the relationship between a sensor voltage and two reference voltages in accordance with the embodiment of FIG. 10.

Referring to FIG. 11, a diagram illustrating the relationship between the sensor voltage and the two reference voltages in accordance with the embodiment of FIG. 10 is shown. FIG. 11 is a graph of voltage versus temperature. The sensor voltage ($V_{sens}$) the first reference voltage ($V_{ref1}$) and the second reference voltage ($V_{ref2}$) are plotted on the graph. As in the previous embodiment, the sensor voltage has a negative temperature coefficient, while the reference voltages have positive temperature coefficients. There is one point at which the plot of the sensor voltage crosses the plot of the first reference voltage (at temperature $T_1$ and voltage $V_1$,) and one point at which the plot of the sensor voltage crosses the plot of the second reference voltage (at temperature $T_2$ and voltage $V_2$.)

Figure 12:
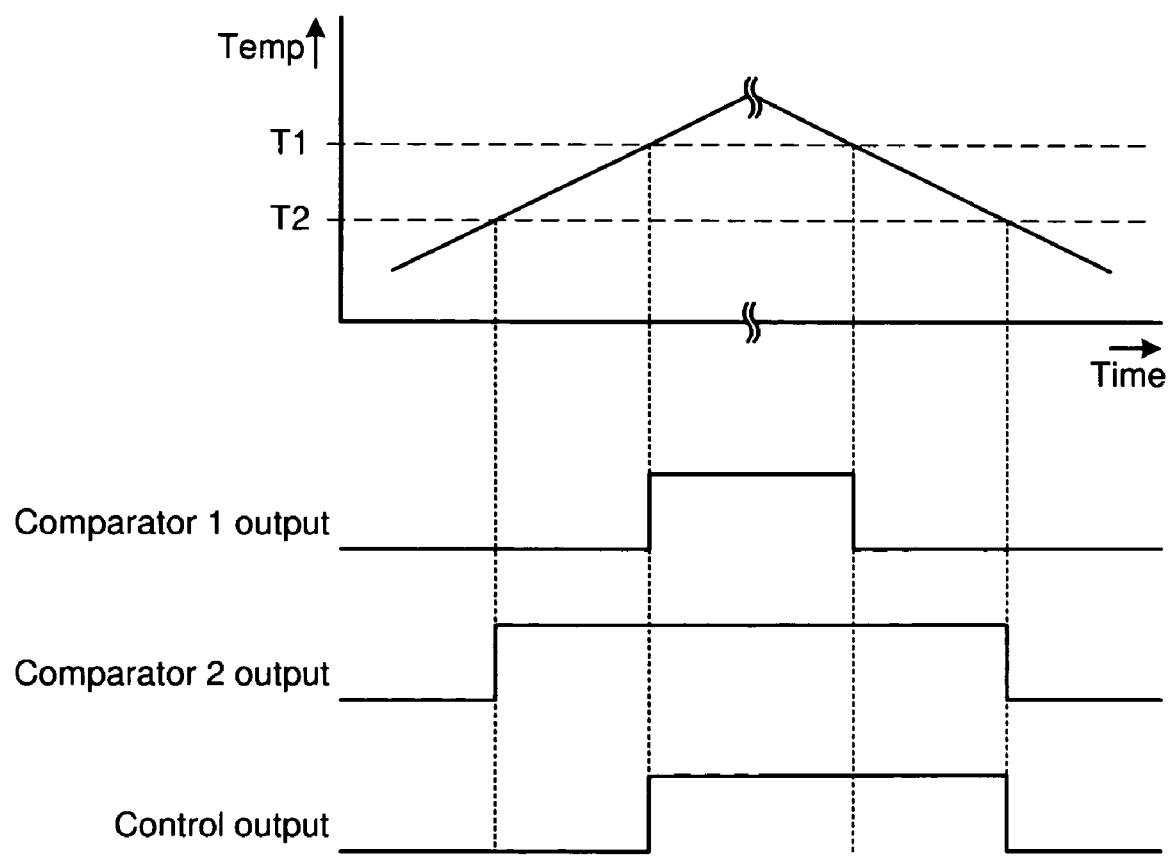
FIG. 12 is a diagram illustrating output signals generated by a pair of comparators as a function of sensor temperature reference temperatures in accordance with the embodiment of FIG. 10.

Referring to FIG. 12, a diagram illustrating the output signals generated by comparators 1030 and 1035 as a function of the sensor temperature and reference temperatures in accordance with the embodiment of FIG. 10 is shown. As in FIG. 8, the temperature of the thermal sensing element initially increases from a temperature below $T_2$ (the second reference temperature) to a temperature above $T_1$ (the first reference temperature.) Initially, the outputs of comparators 1030 and 1035 are both low. As the temperature of the thermal sensing element exceeds $T_2$, the output of comparator 1035 goes from low to high. When the temperature of the thermal sensing element passes $T_1$, the output of comparator 1030 goes high. At some later time, the temperature of the thermal sensing element decreases from a temperature above $T_1$ to a temperature below $T_2$. When the thermal sensing element temperature drops below $T_1$, the output of comparator 1030 goes from high to low. When the temperature of the thermal sensing element drops below $T_2$, the output of comparator 1035 also goes low.

In this embodiment, the higher reference temperature, $T_1$, can be regarded as a high temperature threshold, above for which it is not safe for the device in which the thermal sensing system is implemented to operate. The lower reference temperature, $T_2$, can be regarded as a low temperature threshold, below which it is safe for the device to resume operation. Control circuit 1040 can therefore be configured to assert a control signal which indicates that the device should be shut down (or its operation scaled back) when the temperature of the sensor exceeds $T_1$, and that the device can resume operation when the temperature of the sensor falls back below $T_2$. Such a binary signal is shown at the bottom of FIG. 12. When I signal is low, the device can operate normally, and when the signal is high, the device should be shut down (or slowed down.)

Figure 13:
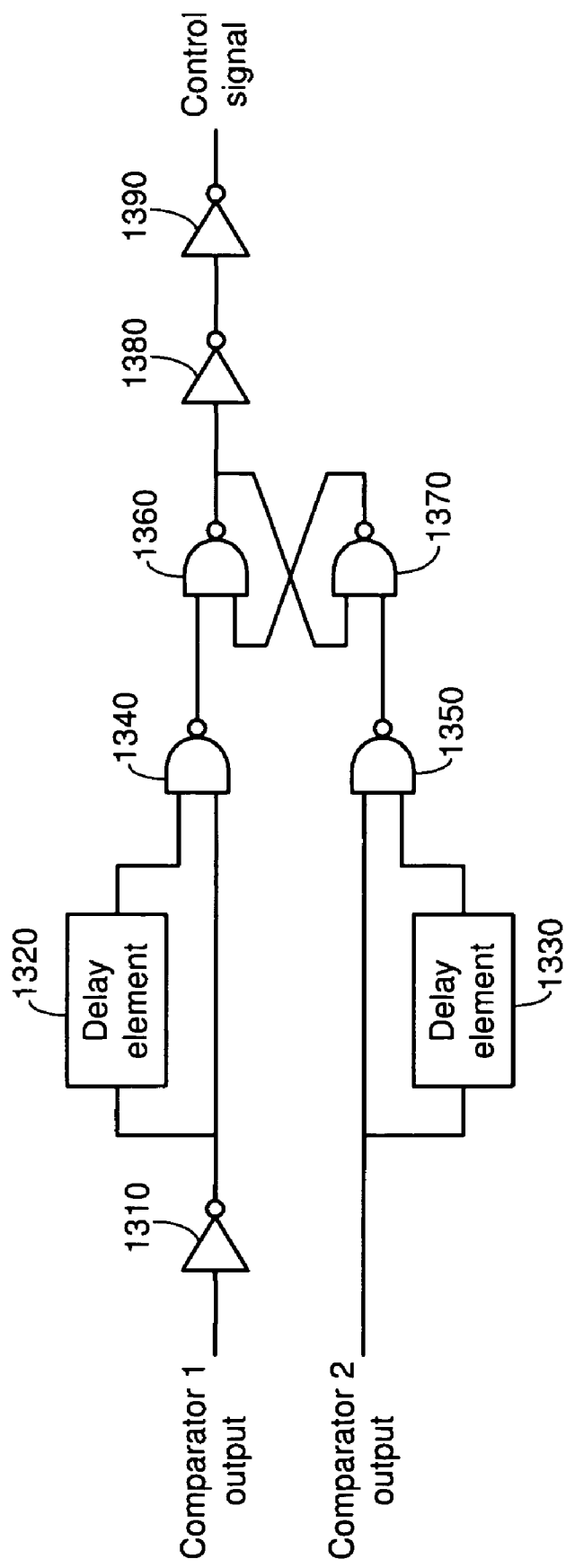
FIG. 13 is a diagram illustrating a control circuit in accordance with one embodiment.

FIG. 13 is a diagram illustrating a control circuit in accordance with one embodiment. As shown in FIG. 13, control circuit 1300 is configured to receive the binary signals generated by comparators 1030 and 1035. Based on these signals, control circuit 1300 generates the control signal shown in FIG. 12.

Control circuit 1300 includes an inverter 1310, first and second delay elements 1320 and 1330, NAND gates 1340, 1350, 1360 and 1370, and inverters 1380 and 1390. Delay elements 1320 and 1330 are provided to prevent unnecessary switching due to noise if the sensor temperature is very near one of the reference temperatures. Delay elements 1320 and 1330 therefore act as noise filters. The time constant of the delays should be determined according to the time period of noise to be filtered.

The output of comparator 1030 is provided to inverter 1310. The inverted signal is then provided to both NAND gate 1340 and delay element 1320. Delay element 1320 delays the inverted signal before providing it to NAND gate 1340. The output of comparator 1035 is provided to one input of NAND gate 1350, as well as to delay element 1330. Delay element 1330 delays the signal before providing it to NAND gate 1350. The outputs of NAND gates 1340 and 1350 are then input to a conventional flip-flop circuit that is constructed using a pair of NAND gates, 1360 and 1370. The output of the flip-flop circuit is then provided to serially configured inverters 1380 and 1390, which drive the control signal at the output of the control circuit.

Figure 14:
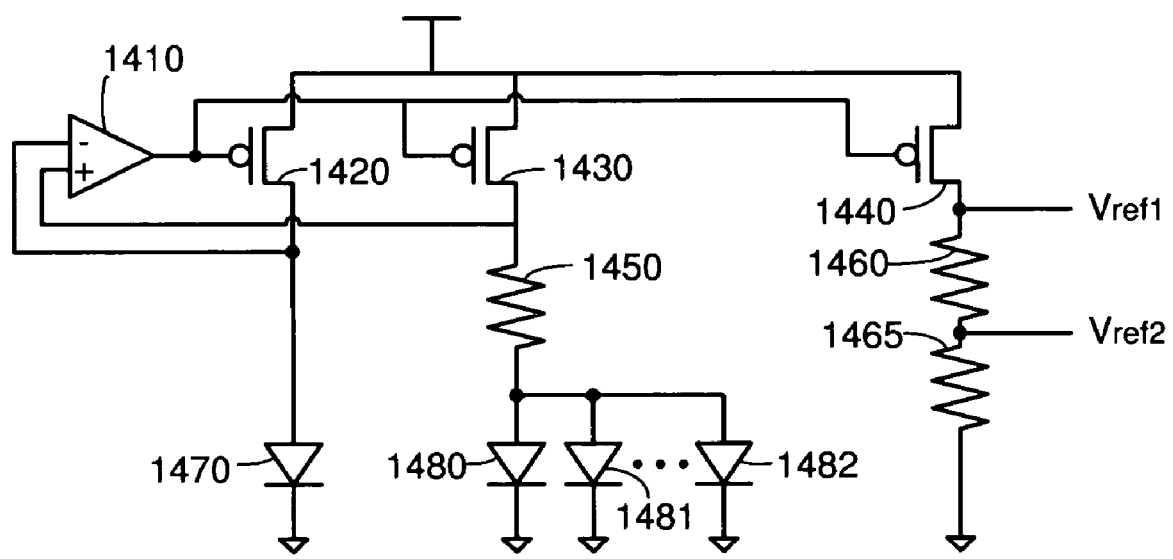
FIG. 14 is a diagram illustrating a thermal sensing system that produces two reference voltages in accordance with one embodiment.

Referring to FIG. 14, a diagram illustrating positive temperature-coefficient voltage generator that produces two reference voltages in accordance with one embodiment is shown. The structure of circuit 1400 is very similar to the structure of circuit 900. System 1400 includes a first transistor, 1420, having its source connected to a power supply voltage and its drain connected to the anode of a diode, 1470. The cathode of diode 1470 is connected to ground. A second transistor, 1430, also has its source connected to the power supply voltage, but has its drain connected to one and of a resistor, 1450. The other end of resistor 1450 is connected to the anodes of diodes 1480-1482. The cathodes of diodes 1480-1482 are connected to ground. A third transistor, 1440, has its source connected to the power supply voltage and has its drain connected to one end of resistor 1460. The other end of resistor 1460 is connected to one end of a second resistor, 1465. The other end of resistor 1465 is connected to ground.

The difference between circuit 1400 and circuit 900 is that there are two resistors (1460 and 1465) connected in series between the third transistor and ground, rather than a single resistor (960.) Circuit 1400 can therefore provide a first reference voltage at the node between transistor 1440 and resistor 1460, and a second reference voltage at the node between resistor 1460 and resistor 1465. It should be noted that, in alternative embodiments, additional resistors can be positioned between the third transistor and ground in order to provide additional reference voltages. It may also be possible to provide an element having variable resistance, rather than a simple resistor, so that the value of one of the reference voltages can be adjusted.

As mentioned above, the embodiments of the present invention may require substantially less space in an electronic device (e.g., an integrated circuit) than conventional thermal sensing systems. The present embodiments may therefore be less costly and easier to implement. Designers may therefore have more freedom to place the present thermal sensing systems in desired locations, or may even be able to implement multiple thermal sensors in a device.

Figure 15:
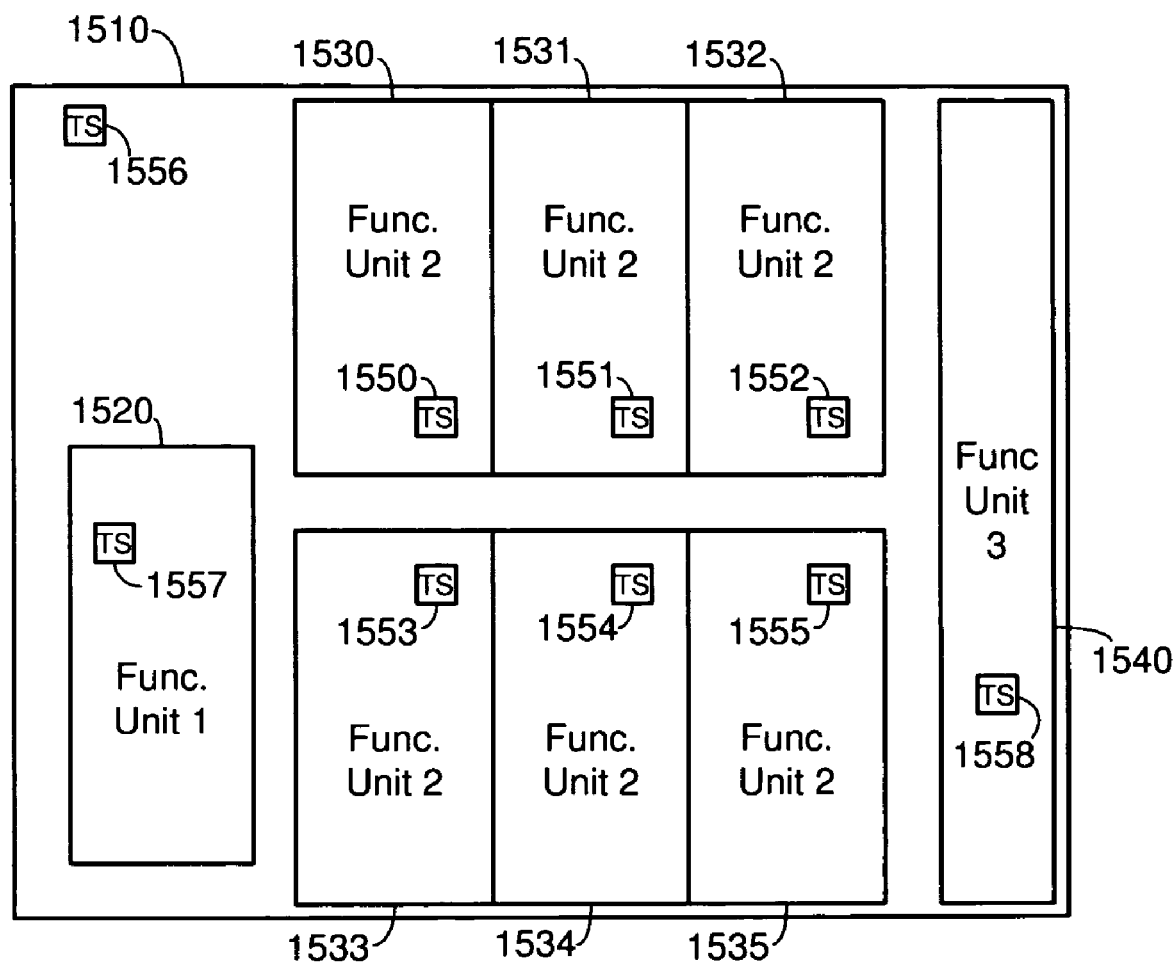
FIG. 15 is a diagram illustrating an electronic device and the placement of multiple thermal sensors within functional units of the device in accordance with one embodiment.

Referring to FIG. 15, a diagram illustrating an electronic device and the placement of multiple thermal sensors within functional units of the device in accordance with one embodiment is shown. This figure is provided as an example of the many different options that are available for placement of the smaller and simpler thermal sensors described herein. While all of these options are included within the single diagram of FIG. 15, it should be noted that a particular embodiment may employ any one or more of these options.

Depicted in FIG. 15 is an integrated circuit, 1500, having multiple functional units, 1520, 1530-1535, 1540, constructed on a substrate, 1510. Integrated circuit 1500 also includes multiple thermal sensors, 1550-1558. It can be seen that each of the functional units has a corresponding thermal sensor integrated therein, although alternative embodiments may include thermal sensors in only a subset of the functional units. The thermal sensor in each of the functional units may be positioned at or near a "hot spot" of the corresponding functional unit. There is also a thermal sensor (1556) that is placed near the edge of the substrate, apart from the functional units. This thermal sensor may be used to provide a "cool spot" reference that is indicative of the environmental temperature, or that can be used as a basis for comparison with the thermal sensors integrated into the functional units.

Because the different functional units of the device may experience different workloads at different times, some of the functional units may generate more or less heat (hence experience higher or lower temperatures) at different times. The use of separate thermal sensors in each of the functional units may therefore provide a better understanding of the condition and/or operation of the device, thereby allowing the device to be more effectively controlled. For example, if one of the functional units is overheating, but the others are not, it may be possible to scale back or shut down only the overheating functional unit, while allowing the others to continue to operate. Separate sensors may be particularly useful in devices that have multiple similar or identical functional units, such as processors in a multiprocessor device (e.g., functional units 1530-1535.) In these devices, the sensed temperatures may indicate the loading of the corresponding functional units, and may therefore be used for load-balancing purposes. In other words, the hotter functional units may be performing more operations, so additional operations may be directed to the other, cooler functional units. In the case of similar or identical functional units, it is contemplated that the thermal sensors should be located in identical positions in each of the similar/identical functional units.

Those of skill in the art will understand that information and signals may be represented using any of a variety of different technologies and techniques. For example, data, instructions, commands, information, signals, bits and symbols that may be referenced throughout the above description may be represented by voltages, currents, electromagnetic waves, magnetic fields or particles or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with general purpose processors, digital signal processors (DSPs), application specific integrated circuits (ASICs), field programmable gate arrays (FPGAs) or other programmable logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. A thermal sensing system comprising:
    a reference voltage generator configured to generate a non-constant first reference voltage that varies as a known first function of temperature;
    a thermal sensor configured to generate a sensor voltage that varies as a known second function of temperature, wherein the second function intersects the first function; and
    a first comparator configured to
        receive the sensor voltage and the first reference voltage,
        compare the sensor voltage and the first reference voltage, and
        generate a first comparison output signal based on the comparison of the sensor voltage and the first reference voltage;
    wherein the thermal sensor and the reference voltage generator are integrated into a single circuit that includes
        an operational amplifier,
        first, second and third transistors,
        first and second PN junctions, wherein the second PN junction has a cross-sectional area greater than a cross-sectional area of the first PN junction, and
        first and second resistors,
        wherein the source of each of the transistors is tied together and connected to a voltage source,
        wherein the gate of each of the transistors is tied together and connected to an output of the operational amplifier,
        wherein the drain of the first transistor is coupled to an inverting input of the operational amplifier and the drain of the second transistor is coupled to a non-inverting input of the operational amplifier,
        wherein the first PN junction is coupled between the drain of the first transistor and ground,
        wherein the first resistor and the first PN junction are coupled in series between the drain of the second transistor and ground,
        wherein the second resistor is coupled between the drain of the third transistor and ground, and
            wherein the first reference voltage comprises a voltage at the drain of the third transistor.

2. The thermal sensing system of claim 1, wherein the thermal sensor comprises a diode coupled in series with a current source.

3. The thermal sensing system of claim 1, wherein the second resistor comprises a plurality of serially connected resistors and wherein one or more additional reference voltages are generated at one or more corresponding nodes between adjacent ones of the plurality of serially connected resistors.

4. The thermal sensing system of claim 1, wherein the first PN junction comprises a first diode and the second PN junction comprises an array of diodes in parallel.

5. The thermal sensing system of claim 1, wherein the first function is proportional to temperature in Kelvin.

6. The thermal sensing system of claim 1, wherein the first comparator comprises a differential amplifier configured to amplify a difference between the sensor voltage and the reference voltage.

7. The thermal sensing system of claim 1, wherein the reference voltage generator is configured to generate a non-constant second reference voltage that varies as a known third function of temperature, wherein the second function intersects the third function.

8. The thermal sensing system of claim 1, wherein the reference voltage generator includes one or more diodes, and wherein the reference voltage is generated based on voltages across the diodes.

9. A thermal sensing system comprising:
a reference voltage generator configured to generate a non-constant first reference voltage that varies as a known first function of temperature and a non-constant second reference voltage that varies as a known second function of temperature;
a thermal sensor configured to generate a sensor voltage that varies as a known third function of temperature, wherein the third function intersects the first function and the second function;
a first comparator configured to
receive the sensor voltage and the first reference voltage,
compare the sensor voltage and the first reference voltage, and
generate a first comparison output signal based on the comparison of the sensor voltage and the first reference voltage; and
a second comparator configured to
receive the sensor voltage and the second reference voltage,
compare the sensor voltage and the second reference voltage, and
generate a second comparison output signal based on the comparison of the sensor voltage and the second reference voltage.

10. The thermal sensing system of claim 9, further comprising a control circuit configured to receive the first and second comparison output signals and to generate one or more control signals to control operation of an electronic device in response to the first and second comparison output signals.

11. The thermal sensing system of claim 10, wherein the control circuit is configured to generate a control signal that transitions from a non-asserted state to an asserted state when the sensor voltage is greater than the first and second reference voltages and transitions from the asserted state to the non-asserted state when the sensor voltage is less than the first and second reference voltages.

12. A method comprising:
providing a reference voltage source which provides a first reference voltage that increases as a known first function of temperature and is insensitive to manufacturing variations and a second reference voltage that increases as a known third function of temperature and is insensitive to manufacturing variations;
providing a thermal sensor which provides a sensor voltage that decreases as a known second function of temperature and is insensitive to manufacturing variations;
comparing the sensor voltage to the first reference voltage;
generating a first temperature indicator signal that is not asserted when the sensor voltage is less than the first reference voltage and is asserted when the sensor voltage is greater than the first reference voltages;
comparing the sensor voltage to the second reference voltage; and
generating a second temperature indicator signal that is asserted when the sensor voltage is less than the second reference voltage and is not asserted when the sensor voltage is greater than the second reference voltage.

13. The method of claim 12, wherein the first reference voltage is selectable from a plurality of temperature dependent functions.

14. The method of claim 12, wherein the first reference voltage is proportional to temperature in Kelvin.

15. The method of claim 12, wherein generating the temperature indicator signal comprises amplifying a difference signal between the first reference voltage and the sensor voltage.

16. The method of claim 15, wherein the temperature indicator signal is at ground when the first reference voltage is less than the sensor voltage and at Vdd when the first reference voltage is greater than the sensor voltage.

17. The method of claim 12, further comprising generating a control signal that transitions from a non-asserted state to an asserted state when the sensor voltage is greater than the first and second reference voltages and transitions from the asserted state to the non-asserted state when the sensor voltage is less than the first and second reference voltages.

18. The method of claim 12, wherein the reference voltage source includes one or more diodes, and wherein providing the first reference voltage comprises generating the first reference voltage based on voltages across the diodes.

* * * * *